(12) United States Patent
Kalevo et al.

(10) Patent No.: US 9,245,353 B2
(45) Date of Patent: Jan. 26, 2016

(54) ENCODER, DECODER AND METHOD

(71) Applicant: GURULOGIC MICROSYSTEMS OY, Turku (FI)

(72) Inventors: Ossi Kalevo, Toijala (FI); Tuomas Kärkkäinen, Turku (FI)

(73) Assignee: Gurulogic Microsystems Oy (FI)

( * ) Notice: Subject to any disclaimer, the term of this patent is extended or adjusted under 35 U.S.C. 154(b) by 67 days.

(21) Appl. No.: 14/058,793

(22) Filed: Oct. 21, 2013

(65) Prior Publication Data

US 2014/0112591 A1    Apr. 24, 2014

Related U.S. Application Data

(63) Continuation-in-part of application No. 13/657,382, filed on Oct. 22, 2012.

(30) Foreign Application Priority Data

Oct. 22, 2012  (GB) .................................... 1218942.9
Aug. 2, 2013  (EP) ............................... 20130003859

(51) Int. Cl.
*G06K 9/64* (2006.01)
*G06T 9/00* (2006.01)
(Continued)

(52) U.S. Cl.
CPC *G06T 9/00* (2013.01); *H04N 19/12* (2014.11); *H04N 19/14* (2014.11); *H04N 19/176* (2014.11); *H04N 19/182* (2014.11); *H04N 19/94* (2014.11)

(58) Field of Classification Search
CPC ........... G06T 9/005; G06T 9/00; H03M 7/30; G09G 2340/02
See application file for complete search history.

(56) References Cited

U.S. PATENT DOCUMENTS 5,668,932 A   9/1997 Laney
5,825,918 A  10/1998 Hoffmann et al.
(Continued)

FOREIGN PATENT DOCUMENTS

EP   2265029 A1  12/2010
JP   10-51642     2/1998
JP   11-164150    6/1999
WO   00/19374 A1  4/2000

OTHER PUBLICATIONS

Kamel, M.; Sun, C.T.; Lian Guan, "Image compression by variable block truncation coding with optimal threshold," Signal Processing, IEEE Transactions on , vol. 39, No. 1, pp. 208,212, Jan. 1991.*
(Continued)

*Primary Examiner* — Stephen R Koziol
*Assistant Examiner* — Jonathan S Lee
(74) *Attorney, Agent, or Firm* — Eric L. Sophir; Dentons US LLP

(57) ABSTRACT

An encoder generating encoded data. The encoder comprising an analysis unit for analysing portions of data to be encoded, and for directing the portions to one or more encoding units, the encoding units are operable to encode the data portions to generate encoded data. The one or more encoding units are operable to employ mutually different encoding algorithms when encoding the one or more portions. At least one encoding unit of the one or more encoding units is operable to compute data values present in each portion received thereat, to sub-divide the data values into at least two sets, to compute at least one aggregate value for a given set derived from the data values present in the given set. A corresponding decoder for decoding data generated by the encoder executes an inverse of encoding steps employed in the encoder.

18 Claims, 8 Drawing Sheets

(51) Int. Cl.
*H04N 19/176* (2014.01)
*H04N 19/12* (2014.01)
*H04N 19/14* (2014.01)
*H04N 19/182* (2014.01)
*H04N 19/94* (2014.01)

(56) References Cited

U.S. PATENT DOCUMENTS

| | | | | |
|---|---|---|---|---|
| 5,982,937 | A * | 11/1999 | Accad | H04N 1/41 382/166 |
| 6,151,409 | A * | 11/2000 | Chen et al. | 382/166 |
| 6,285,458 | B1 | 9/2001 | Yada | |
| 6,567,559 | B1 | 5/2003 | Easwar | |
| 8,108,361 | B2 * | 1/2012 | Netz | G06F 17/30501 380/28 |
| 2002/0186890 | A1 | 12/2002 | Lee et al. | |
| 2005/0088692 | A1 * | 4/2005 | Imaizumi et al. | 358/1.16 |
| 2006/0023941 | A1 * | 2/2006 | Drebin et al. | 382/166 |
| 2006/0215914 | A1 * | 9/2006 | Aleksic et al. | 382/232 |
| 2006/0269127 | A1 * | 11/2006 | Ogden et al. | 382/166 |
| 2007/0269118 | A1 * | 11/2007 | Sasaki et al. | 382/232 |
| 2008/0131008 | A1 * | 6/2008 | Drebin et al. | 382/233 |
| 2013/0159811 | A1 * | 6/2013 | Biran | H03M 7/30 714/758 |

OTHER PUBLICATIONS

Franti et al., "Compression of Digital Images by Block Truncation Coding: A Survey," Computer Journal, Oxford University Press, vol. 37, No. 4, Jan. 1, 1994, pp. 308-332.
Cuiling et al., "Compress Compound Images in H. 264/MPEG-4 AVC by Fully Exploiting Spatial Correlation," IEEE Int'l Symposium on Circuits and Systems, May 24, 2009, pp. 2818-2821.
Stearns et al., "Lossless Compression of Waveform Data for Efficient Storage and Transmission," IEEE Transactions on Geoscience and Remote Sensing, vol. 31, No. 3, May 1993.
Tan et al., "A Bi-Level Block Coding Technique for Encoding Data Sequences with Sparse Distribution," the Technology Interface Journal/IAJC-IJME Conference, vol. 9, No. 1.
Zeng et al., "A Block Coding Technique for Encoding Sparse Binary Patterns," IEEE Transactions on Acoustics, Speech, and Signal Processing, vol. 37, No. 5, May 1989, pp. 778-780.
European Search Report dated Jan. 23, 2014 corresponding to European Patent Application No. 13003859.9, 11 pages.
Notification of ground of rejection dated Sep. 2, 2014, for corresponding Japanese Patent Application No. 2013-214397, 9 pages (with English translation).
Examination Report under Section 18(3) dated Aug. 2, 2013, issued by United Kingdom Intellectual Property Office in a related British Application No. GB1218942.9, 5 pages.
Combined Search and Examination Report under Sections 17 and 18(3) dated Feb. 19, 2013 issued by the U.K. Patent Office in related U.K. Patent Application No. GB1218941.9, 9 pages.
Office Action dated Mar. 10, 2015, issued by the Patent Office of Russian Federation in a related Russian Application No. 2013144665/08(068952), 8 pages.
English Translation of an Office Action dated Mar. 10, 2015, issued by the Patent Office of Russian Federation in a related Russian Application No. 2013144665/08(068952), 7 pages.

* cited by examiner

ENCODER, DECODER AND METHOD

CROSS-REFERENCE TO RELATED APPLICATIONS

This application is a continuation-in-part of U.S. patent application Ser. No. 13/657,382, titled "ENCODER, DECODER AND METHOD," filed Oct. 22, 2012, which claims priority to European Patent Application No. 13003859.9, titled "ENCODER, DECODER AND METHOD," filed on Aug. 2, 2013, and to United Kingdom patent application Ser. No. 1218942.9, titled "ENCODER, DECODER AND METHOD," FILED Oct. 22, 2012, all of which are herein incorporated by reference in their entirety.

FIELD OF THE INVENTION

The present disclosure relates to encoders for encoding data (D1) corresponding to a variety of content, for example still images, video content, graphics content, audio content, measurement data and so forth, for generating corresponding encoded data (E2). Moreover, the present disclosure concerns methods of encoding data (D1) corresponding to a variety of content, for example still images, video content, graphics content, audio content, measurement data and so forth, for generating corresponding encoded data (E2). Furthermore, the present disclosure relates to decoders for decoding data (E2) in an encoded format generated by the aforesaid encoders. Additionally, the present disclosure is concerned with methods of decoding data (E2) generated by aforesaid encoders. Yet additionally, the present disclosure relates to software products recorded on non-transitory machine-readable data storage media, wherein the software products are executable upon computing hardware for implementing aforementioned methods.

BACKGROUND

There are many contemporary known methods of encoding data (D1) to generate encoded data (E2), and also decoding the encoded data (E2) to generate decoded data (D3). Nevertheless, there is a lack of a method of encoding data which is suitable for a broad range of content represented by the data (D1) to be encoded, for example still images, video content, audio content or graphics data. Such encoding has as its primary aim to generate encoded data (E2) that is more compact than corresponding data (D1) to be encoded. Moreover, there is also a lack of a corresponding decoder for decoding such encoded data (E2).

Image encoding methods such as JPEG ("Joint Photographic Experts Group", namely lossy DCT-based coding, wherein "DCT" is an abbreviation for Discrete Cosine Transform), JPEG2000 ("Joint Photographic Experts Group", namely wavelet-based encoding) and WebP (image format encoding which employs both lossy and lossless compression during encoding) are known to be well adapted for compressing natural image content, but are less suitable for compressing text or images whose colours are described by only a few colour values and whose content has a relatively high spatial frequency component. An alternative known method of encoding data is referred to as GIF ("Graphics Interchange Format") and employs a palette-based compression algorithm which is well adapted to encode images that can be presented with a relatively small number of colour values required to render the images, for example 256 colour values; however, if the images to be encoded by GIF algorithms include natural objects having subtle spatially-gradual colour variations, GIF creates undesirable artefacts which are noticeable in corresponding decoded GIF images. Known contemporary PNG encoding ("Portable Networks Graphics", lossless encoding) is generally similar to GIF encoding and provides more options for encoding image data, but is not nevertheless well adapted for images which contain a small range of colour values. Other known encoding methods employ text encoding using OCR ("Optical Character Recognition") in combination with encoding characters; OCR is sometimes an appropriate method to employ, but is sensitive to positioning of text within an image, tilting of the text within the image, a font of the text and also an object in which the text is located; additionally, OCR can potentially require considerable processing power for its implementation.

More recently, scientific publications have proposed further alternative encoding methods which are suitable for encoding data that is in a bi-level block data sequence format; details of these scientific publications are provided in Table 1.

TABLE 1

Encoding methods for encoding data in a bi-level block data sequence format.

| Title of publication | Authors | Publication details |
| --- | --- | --- |
| "A bi-level block coding technique for encoding data sequences with sparse distribution" | Li Tan and Jean Jiang | Proceedings of the 2008 IAJC-IJME International Conference, International Journal of Modern Engineering (IJME), paper 185, ENT 201. ISBN 978-1-60643-379-9 |
| "Lossless compression of waveform data for efficient transmission and storage" | S. D. Stearns, L. Tan, and N. Magotra | IEEE Transactions on Geoscience and Remote Sensing, Vol. 31, no. 3, pp 645-654, May 1993 |
| "A block coding technique for encoding sparse binary patterns" | G. Zeng and N. Ahmed | IEEE Transactions on Acoustics, Speech and Signal Processing, Vol. 37, no. 5, pp 778-780, May 1989 |

Aforesaid known methods of encoding data, and corresponding known methods of decoding such encoded data, are not well adapted for a broad range of content represented by the data, despite the known methods employing a wide range of mutually different approaches. Despite considerable research over many years to evolve more efficient encoding algorithms to provide improved data compression, namely an issue of great importance to communication systems handling streamed video content, an optimal encoding method has yet to be devised.

U.S. Pat. No. 6,151,409 ("Methods for Compressing and Reconstructing a Color Image in a Computer System"; Applicant—National Science Council, Taipei, Taiwan) recites a method of compressing a colour image, namely by employing visual block pattern truncation coding (VBPIC), in which conventional block truncation coding (BTC) serves to encode an original image. The method defines an edge block according to human visual perception. In an event that a difference between two quantized values of BTC in a block is larger than a threshold value which is defined by visual characteristics, the block will be identified as an edge block. In an edge block, the bitmap is adapted to compute block gradient orientation and to match the block pattern.

The method is only barely suitable for an image that contains only 4×4 blocks which further contain either a DC level or a clear edge at an angle of 90° or 45°. Moreover, the method is capable of removing noise, or is capable of removing details when the mask does not hit the target exactly. Furthermore, the method is not at all suitable for coding text or texture, and is not suitable for coding patterns that cannot be expressed with a straight line, or that have a different direction from multiples of 45°.

U.S. Pat. No. 5,668,932 ("Digital Video Data Compressions Technique", Applicant—Microsoft Corporation) recites an alternative technique for compressing digital video data that provides improved compression relative to conventional block compression techniques. In the alternative technique, image data is broken down into cells and iteratively compressed. The cells are compressed using compression formats that are most appropriate for the contents of the cells. A determination is first made whether or not a cell is substantially identical to a succeeding cell in a previous frame. If the cell is substantially identical to the cell in the previous frame, the cell is encoded in compressed form as a duplicate of the previous cell. Moreover, solid-colour compression approaches and eight-colour compression approaches may be integrated into the compression technique.

Thus, the method uses a bit mask which conveys whether a given pixel being processed belongs to a higher value, namely brighter pixels, or to a lower value, namely dimmer pixels, for each block, cell or sub-block. Moreover, the method attempts to encode entire images.

Published PCT application WO 00/19374 ("Compressing and Decompression Image Data with 4-level Block Coding", Applicant—Silicon Graphics Inc.) recites a method and an apparatus for compressing and uncompressing image data. Optionally, the method of compressing a colour cell comprises steps of:

(i) defining at least four luminance levels of the colour cells;

(ii) generating a bitmask for the colour cells, wherein the bitmask has a plurality of entries each corresponding to a respective one of the pixels, and each of the entries for storing data identifying one or the luminance levels associated with a corresponding one of the pixels;

(iii) calculating a first average colour of pixels associated with a first one of the luminance levels;

(iv) calculating a second average colour of pixels associated with a second one of the luminance levels; and (v) storing the bitmask in association with the first average colour and the second average colour.

Optionally, the colour cell includes a matrix of 4×4 pixels, the bitmask includes 32-bits, and each of the colour values include 16-bits, such that a compression rate of 4-bits per pixel is achievable. The method is applicable to compress texture data, such that the texture data is capable of being more efficiently cached and moved during texture mapping; compression of luminance, intensity and alpha textures are also possible to be achieved.

Moreover, aforementioned known coding methods have various shortcomings which makes them unsuitable for a wide spectrum of types of data.

SUMMARY

The present disclosure seeks to provide an improved method of encoding data (D1) to generate corresponding encoded data (E2), for example encoded data (E2) which is compressed relative to its corresponding unencoded data (D1).

Moreover, the present invention also seeks to provide an encoder which employs an improved method of encoding data (D1) to generate corresponding encoded data (E2), for example encoded data (E2) which is compressed relative to its corresponding unencoded data (D1).

Furthermore, the present invention seeks to provide an improved method of decoding data (E2) generated from encoders pursuant to the present invention.

Additionally, the present invention seeks to provide an improved decoder for decoding data (E2) generated from encoders pursuant to the present invention.

According to a first aspect, there is provided an encoder as claimed in appended claim 1: there is provided an encoder for encoding data (D1) to generate corresponding encoded data (E2), characterized in that the encoder includes an analysis unit for analysing one or more portions of the data (D1) to be encoded and directing the one or more portions to appropriate one or more encoding units, wherein the one or more encoding units are operable to encode the one or more portions thereat to generate the encoded data (E2), wherein:

the one or more encoding units are operable to employ mutually different encoding algorithms when encoding the one or more portions;

at least one encoding unit of the one or more encoding units is operable to compute data values present in each portion received thereat, to subdivide the data values into at least two sets, to compute at least one aggregate value for a given set derived from the data values present in the given set, and whilst retaining a spatial mask of the portion, and wherein the spatial mask and information representative of the values computed for the at least two data sets are included in the encoded data (E2).

The present invention is of advantage in that the encoder is operable to compute aggregate values of sets and masks defining layouts of portions of the data (D1) to be encoded for inclusion in encoded data (E2) from the encoder which provides for efficient encoding of certain types of content present in the data (D1) to be encoded.

Optionally, the encoder includes an output encoder unit for receiving encoded output data from the one or more encoding units and for further encoding this encoded output data to generate the encoded data (E2) from the encoder.

Optionally, the encoder further includes an input stage for sub-dividing and/or combining the data (D1) to be encoded to generate the one or more portions when the data (D1) to be encoded is not already included in the one or more portions.

Optionally, in the encoder, the at least one encoding unit of the one or more encoding units is operable to subdivide the data values present in each portion into a range of 2 to 8 data sets, or 2 or more data sets. For example, 8 data sets are optionally used for 8-bit binary data.

Optionally, the encoder is operable to store information representative of the one or more masks of the one or more portions in a remote database for access by one or more decoders when decoding the encoded data (E2) generated by the encoder.

Optionally, in the encoder, the at least one aggregate value is an arithmetic average, a skewed average, a logarithmic average, a weighted average, a mean value, a minimum value, a maximum value, a modal value, or a median value. Other types of computation are also possible, for example, a computed result of a complex mathematical function, for example a polynomial computation that provides a form of aggregated result. For example, one example of other types of computation involves selecting the original data set value in a manner that minimizes the distance between the original value and the mean value of the maximum value and the minimum value. This kind of aggregate value minimizes a maximum error in the data set and often creates also a small MSE.

According to a second aspect, there is provided a method of encoding data (D1) to generate corresponding encoded data (E2), characterized in that the method includes:

(a) using an analysis unit for analysing one or more portions of the data (D1) to be encoded and directing the one or more portions to appropriate one or more encoding units, wherein the one or more encoding units are operable to encode the one or more portions thereat to generate the encoded data (E2), wherein the one or more encoding units are operable to employ mutually different encoding algorithms when encoding the one or more portions; and (b) using at least one encoding unit of the one or more encoding units to compute data values present in each portion received thereat, to subdivide the data values into at least two sets, to compute at least one aggregate value for a given set derived from the data values present in the given set, and whilst retaining a spatial mask of the portion, wherein the spatial mask and information representative of the values computed for the at least two data sets are included in the encoded data (E2).

Optionally, the method includes using an output encoder unit for receiving encoded output data from the one or more encoding units and for further encoding this encoded output data to generate the encoded data (E2).

Optionally, the method includes using at least one encoding unit of the one or more encoding units to subdivide the data values present in each portion into a range of 2 to 8 data sets, or 2 or more data sets.

Optionally, the method includes storing information representative the one or more masks of the one or more portions in a remote database for access by one or more decoders when decoding the encoded data (E2).

Optionally, in the method, the encoded data (E2) is further encoded and/or compressed. More optionally, in the method, the further encoding and/or compression includes at least one of DPCM ("differential pulse-code modulation"), RLE ("run-length encoding"), SRLE ("Split run-length encoding", a method disclosed in GB1303660.3 as well as corresponding U.S. patent application Ser. No. 13/782,872 filed by Gurulogic Microsystems Oy on 1 of Mar. 2013), EM ("Entropy Modifier", a method disclosed in GB1303658.7 as well as corresponding U.S. patent application Ser. No. 13/782,757 filed by Gurulogic Microsystems Oy on 1 Mar. 2013), arithmetic encoding, delta coding, ODelta coding (a method disclosed in GB1303661.1 as well as corresponding U.S. patent application Ser. No. 13/782,819 filed by Gurulogic Microsystems Oy on 1Mar. 2013), VLC ("Variable-Length Coding"), Lempel-Ziv coding (ZLIB, LZO, LZSS, LZ77), Burrow-Wheeler transform-based coding (RLE, BZIP2), Huffman coding.

According to a third aspect, there is provided a decoder for decoding encoded data (E2) to generate corresponding decoded data (D3), characterized in that the decoder includes an delivery unit for delivering one or more portions of the encoded data (E2) and directing the one or more portions to appropriate one or more decoding units, wherein the one or more decoding units are operable to decode the one or more portions thereat for generating the decoded data (D3), wherein at least one of the one or more decoding units is operable to extract a spatial mask and information representative of aggregate values for at least two data sets included in the encoded data (E2), and for assigning values to elements in the data block pursuant to which of the sets the elements belong as defined by the mask.

Optionally, the decoder includes an output decoder unit for receiving decoded output data from the one or more decoding units and for further combining these decoded output data to generate the total decoded data (D3) from the decoder.

Optionally, the decoder further includes an input stage for extracting from the encoded data (E2) one or more portions for directing as defined by encoding parameters present in the encoded data to one or more decoding units.

Optionally, in the decoder, the at least one of the one or more decoding units is operable to assign values to elements of the mask corresponding to the data sets, wherein there are in a range of 2 to 8 data sets, or 2 or more data sets. For example, 8 data sets are optionally used for 8-bit binary data.

Optionally, the decoder is operable to retrieve information representative the one or more masks of the one or more portions from a remote database when decoding the encoded data (E2) generated by an encoder.

Optionally, the decoder is implemented such that the aggregate value is at least one of an arithmetic average, a skewed average, a logarithmic average, a weighted average, a mean value, a minimum value, a maximum value, a modal value, or a median value. Other types of computation are also possible, for example, a computed result of a complex mathematical function, for example a polynomial computation which provides a form of aggregated result. For example, one example of other types of computation involves selecting the original data set value in a manner that minimizes the distance between the original value and the mean value of the maximum value and the minimum value. This kind of aggregate value minimizes a maximum error in the data set and often creates also a small MSE.

According to a fourth aspect, there is provided a method of decoding encoded data (E2) to generate corresponding decoded data (D3), characterized in that the method includes:

(a) using an delivery unit for delivering one or more portions of the encoded data (E2) and directing the one or more portions to appropriate one or more decoding units, wherein the one or more decoding units are operable to decode the one or more portions thereat for generating the decoded data (D3); and (b) using at least one decoding unit of the one or more decoding units to extract a spatial mask and information representative of aggregate values computed for at least two data sets included in the encoded data (E2), and to assign values to elements in the data block pursuant to which of the sets the elements belong as defined by the mask.

Optionally, the method includes using an output decoder unit for receiving decoded data from the one or more decoding units and for further combining these decoded output data to generate the total decoded data (D3).

Optionally, the method further includes using an input stage for extracting from the encoded data (E2) one or more portions for directing as defined by encoding parameters present in the encoded data (E2) to one or more decoding units.

Optionally, in the method, the at least one decoding unit of the one or more decoding units is operable to assign values to elements of the mask corresponding the data sets, wherein there are in a range of 2 to 8 data sets, or 2 or more data sets. Such an example is beneficially used for 8-bit binary data, although further 16-bit, 32-bit and so forth binary data is optionally used.

Optionally, the method includes retrieving information representative the one or more masks of the one or more portions from a remote database when decoding the encoded data (E2) generated by an encoder.

Optionally, when using the method, the at least one aggregate value is at least one of: an arithmetic average, a skewed average, a logarithmic average, a weighted average, a mean value, a minimum value, a maximum value, a modal value, or a median value. Other types of computation are also possible, for example, a computed result of a complex mathematical function, for example a polynomial computation that provides a form of aggregated result. For example, one example of other types of computation involves selecting the original data set value in a manner that minimizes the distance between the original value and the mean value of the maximum value and the minimum value. This kind of aggregate value minimizes a maximum error in the data set and often creates also a small MSE.

According to a fifth aspect, there is provided a data communication system including at least one encoder pursuant to the first aspect for encoding data (D1) and generating corresponding encoded data (E2), and including at least one decoder pursuant to the third aspect for decoding the encoded data (E2) to generate decoded data (D3).

According to a sixth aspect, there is provided a method of communicating data in a data communication system pursuant to the sixth aspect, wherein the method of communicating data utilizes a combination of a method pursuant to the second aspect, and a method pursuant to the fourth aspect.

According to a seventh aspect, there is provided a software product recorded on non-transitory machine-readable data storage media, characterized in that the software product is executable upon computing hardware for executing a method pursuant to the second aspect.

According to an eighth aspect, there is provided a software product recorded on non-transitory machine-readable data storage media, characterized in that the software product is executable upon computing hardware for executing a method pursuant to the fourth aspect.

It will be appreciated that features of the invention are susceptible to being combined in various combinations without departing from the scope of the invention as defined by the appended claims.

BRIEF DESCRIPTION OF THE DRAWINGS

Embodiments of the disclosure will now be described, by way of example only, with reference to the following diagrams wherein.

In the accompanying diagrams, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION

In overview, the present disclosure is concerned with an improved method of encoding data (D1) to generate corresponding encoded data (E2), wherein the method is capable of providing an enhanced degree of coding efficiency. The improved method is capable of efficiently coding a wide range of content represented in the data (D1) to be encoded, for example still images, video content, graphics content, audio content, ECG ("electrocardiogram"), seismic data and so forth.

Figure 1:
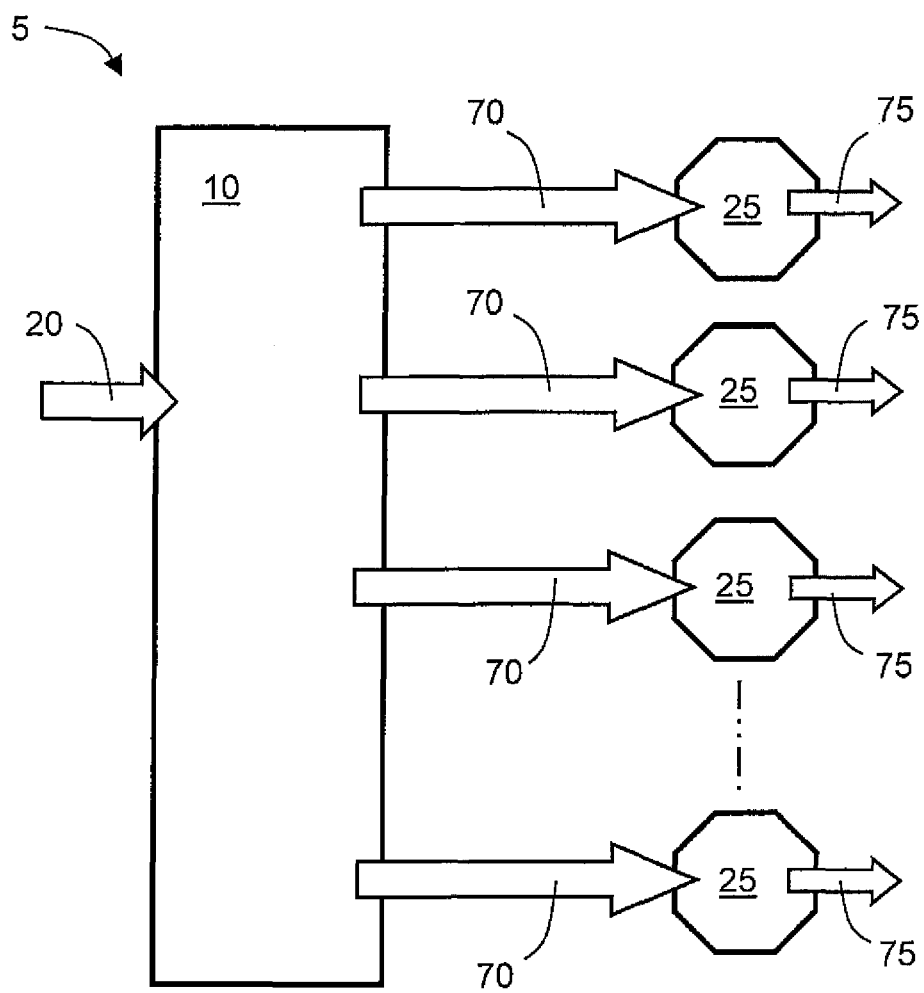
FIG. 1 is an illustration of an encoder and a decoder.

Referring to FIG. 1, there is provided an illustration of an encoder 10 which is operable to encode data 20 (D1) using a method pursuant to the present disclosure. The encoder 10 generates encoded data 70 (E2) which can be stored and/or streamed for subsequent decoding at one or more decoders 25. The one or more decoders 25 are operable to generate corresponding decoded data 75 (D3) for consumption by one or more users. The decoded data 75 (D3) optionally corresponds substantially to the unencoded data 20 (D1). A combination of at least one encoder 10 and at least one corresponding decoder 25 forms a data communication system indicated generally by 5, namely a codec arrangement.

Figure 2A:
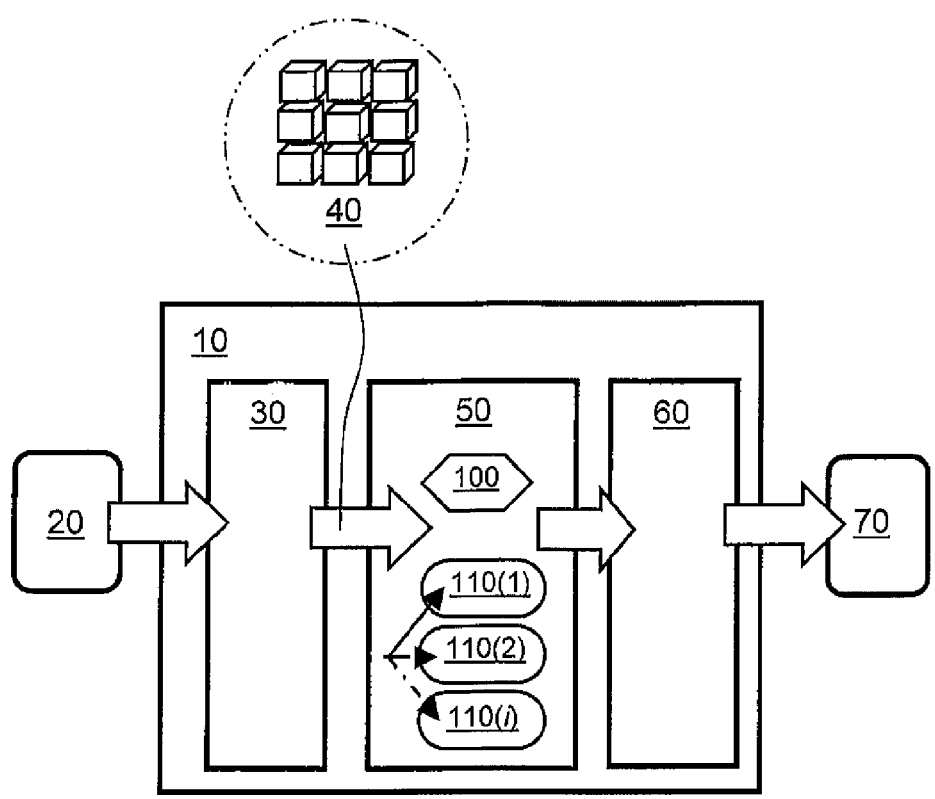
FIG. 2A is a schematic illustration of an encoder for implementing a method of encoding data.

Referring to FIG. 2A, there is provided an illustration of the encoder 10 which is operable to encode the data 20 (D1) using a method pursuant to the present disclosure. The encoder 10 employs a first stage 30 which partitions the data 20 (D1) to be encoded into data blocks 40, if the data 20 (D1) is not already in a data block format; such partitioning of the data 20 (D1) to be encoded optionally results in the data blocks 40 being of mutually different size, namely non-uniform, depending upon a nature of data content included within the data blocks 40; this is distinguished from many known encoding algorithms which employ a uniform partitioning of data (D1) into corresponding data blocks.

In a second stage 50, the encoder 10 includes an analysis unit 100 and a plurality of encoding units 110(1) to 110(n) which employ various types of encoding algorithms, wherein the encoding algorithms are mutually different, and some of the encoding algorithms can be known algorithms, for example DCT, but not limited thereto, wherein the encoding units 110(1) to 110(n) are used selectively to process each data block 40. It will be appreciated that some of the algorithms employed in the encoding units 110(1) to 110(n) are mutually substantially similar, but executed temporally in a parallel manner.

At least one of the encoding units 110(1) to 110(n) is operable to sort data present in its data block 40 into at least two levels as well as generating a mask or masks describing which data values in the data block 40 belong to which corresponding level, as well as computing aggregate values of the data sorted into each level, for example an average value, a mean value or similar. The mask is beneficially implemented as a spatial bit map.

A third stage 60 involves compressing the bitmap as well as the aggregate values for each level to generate encoded data 70 (E2) from the encoder 10; different compression algorithms are optionally employed for the third stage 60, for example RLE ("Run-length encoding"), DPCM ("Differential pulse-code modulation"), VLC ("Variable-length coding"), SRLE, EM (Entropy Modifier), ODelta coding, Range Coding, although other data compression algorithms are alternatively or additionally employed, for example multi-stage data compression.

Optionally, the encoder 10 can be employed in combination with other encoders for achieving hybrid encoding of the data 20 (D1) to generate encoded data 70 (E2), for example DCT, palette, DPCM. In practice, the term "level" can correspond to one or more of: a chrominance level, a luminance level, a colour value, a brightness, an amplitude, a frequency, an intensity; however, "level" can also include other parameters describing physical variables, depending upon a nature of the data 20 (D1) to be encoded.

In the first stage 30, the data blocks 40 can vary in size, depending upon a nature of content present in the data 20 (D1) to be encoded. The data 20 (D1) is optionally 1-dimensional, for example audio content, ECG-data (Electrocardiography), seismic data. Alternatively, the data 20 (D1) is multi-dimensional, for example still images, video content, graphics content, 3D image/video/graphics. Moreover, 2-dimensional input data includes, for example, square, triangle, circle, and similar elements, namely optionally any form of 2-dimensional geometrical shape. Furthermore, 3-dimensional image data includes, for example, elements which are cubic, pyramid, cylinder, ball-shaped, and so forth. When the data 20 (D1) to be encoded includes spatially high frequency components and only a few levels to define spatial elements represented in the data 20 (D1), contemporary known encoding methods are especially ineffective, but are processed efficiently in the encoder 10. Optionally, the encoder 10 is capable of encoding the data 20 (D1) as original data or formed by way of pre-encoding processing, for example DPCM, motion estimation, spatial prediction.

Figure 3:
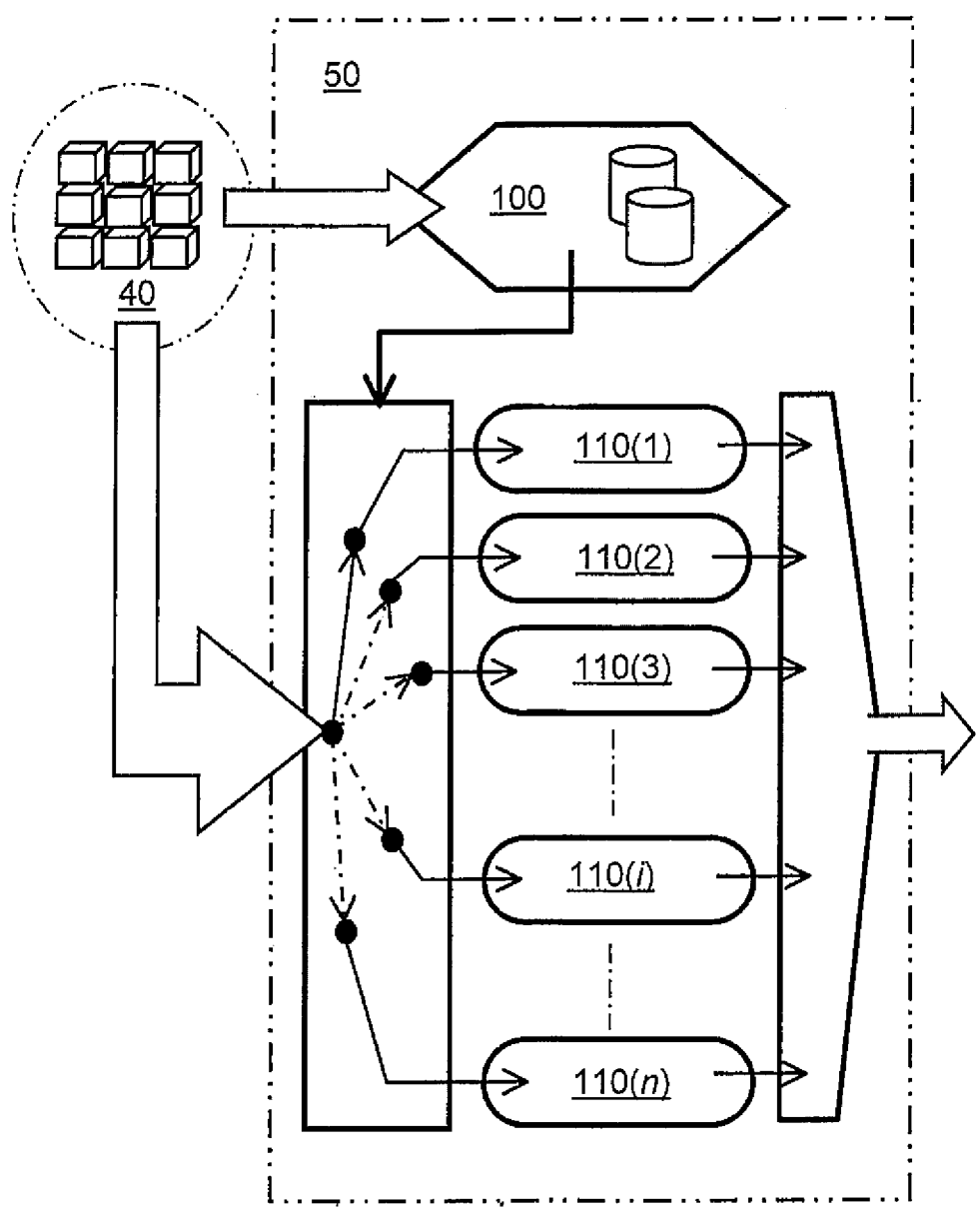
FIG. 3 is a schematic illustration of a second encoding stage of the encoder of FIG. 2A.

As aforementioned, in the second stage 50 of the encoder 10, a compression method pursuant to the present disclosure is employed as illustrated in FIG. 3. Data blocks 40 from the first stage 30 are analysed in an analysis unit 100 to determine a most appropriate encoding algorithm to employ for encoding the data blocks 40; depending upon the analysis executed merely by the analysis unit 100, or by the analysis unit 100 with help of one or more encoding units 110(1) to 110(n), the data blocks are directed to one or more encoding units 110(1) to 110(n), wherein n is an integer and describes a total number of different coding algorithms employed within the second stage 50; the total number of different coding algorithms optionally includes a combination of known encoding algorithms, together with, for example, a two-level encoding algorithm pursuant to the present disclosure, wherein computed values associated with the two levels are, for example, determined from, for example, a mean, a mode, a median or an average computation applied to data values within a given data block 40 being encoded; it will be appreciated that a two-level encoding algorithm is merely an example, and that various multi-level algorithms are optionally employed.

The analysis unit 100 analyses a number of different colours present in the data blocks 40 and spatial frequency information present in the data blocks 40 for purposes of deciding which encoding unit 110 is optimal to employ for encoding a given type of data block 40. The encoding units 110 optionally employ one or more of: DC ("Direct Current") encoding, slide encoding, DCT ("discrete cosine transform"), wavelet encoding, palette encoding, database encoding, VQ ("vector quantization") encoding, scale encoding, line encoding, interpolation and extrapolation methods. In encoded data from the second stage 50, there is included data indicative of which of the encoder units 110 have been employed for any given data block 40. At least one encoding unit 110(1) of the encoding units 110, wherein an integer i is in a range 1 to n, employs a coding algorithm pursuant to the present disclosure which will be described in more detail later.

Optionally, sizes of the data blocks 40 can vary in a data stream provided from the first stage 30, wherein information provided to the second stage 50 also includes information which is spatially indicative of where the data blocks 40 are included in any one or more given images; such information is included in the encoded data provided from the second stage 50; such inclusion of the data-block position indicative data is beneficially implemented as described in United Kingdom patent application no. GB1214414.3 (encoder), which has related filings in U.S. Ser. No. 13/584,005 & EP13002521.6, and United Kingdom patent application no. GB1214400.2 (decoder), which has related filings in U.S. Ser. No. 13/584,047 & EP13002520.8, these applications being hereby incorporated by reference, as well as corresponding related foreign patent applications are also hereby incorporated by reference. Alternatively, such inclusion is beneficially implemented in the third stage 60. Sizes of the data-blocks can be presented with numbers such as height x width expressed in pixels. Spatial positions of the data-blocks are beneficially defined as co-ordinates relative to the image such as x, y pixels from a corner of the image.

Optionally, the analysis unit 100 and the first stage 30 operate in an iterative manner to partition the data 20 (D1) to be encoded into the data blocks 40 in a manner which provides for most efficient data compression in one or more selected encoder unit 110(1) to 110(n), for example spatial positions and sizes of the data blocks 40 within the data 20 (D1) are selected, taking into account the different encoder units 110(1) to 110(n) available to the encoder 10. Optionally, the encoder units 110(1) to 110(n) are implemented, at least in part, in software, and are upgradeable on a periodic bases to improve progressively encoding performance of the encoder 10, for example for enabling the encoder 10 to adapt in a flexible manner to different types of data 20 (D1).

Figure 2B:
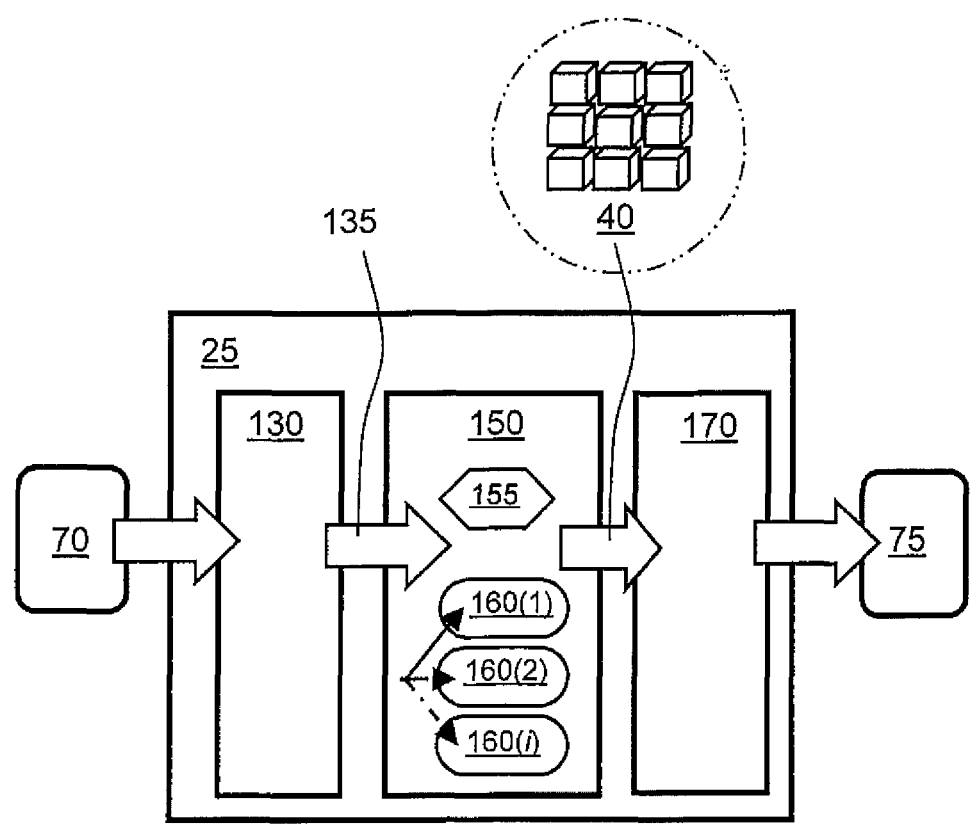
FIG. 2B is a schematic illustration of a decoder for implementing a method of decoding data (E2) that has been encoded pursuant to the present disclosure.

Referring to FIG. 2B, the decoder 25 corresponding to the encoder 10 is shown. The decoder 25 includes a first decoding stage 130 which is operable to receive the encoded data 70 and to execute upon the encoded data 70 an inverse of encoding applied by third stage 60 of the encoder 10 for generate intermediate decoded data denoted by 135. The intermediate decoded data includes information such as which type of encoding unit 110 was employed to encode a given data block 40, a mask for the data block 40, an aggregate value where appropriate, and so forth; optionally, the aggregate value is an average value, a modal value, a median value, but is not limited thereto. The decoder 25 further includes a second stage 150 which includes a delivery unit 155 and one or more decoding units 160(1) to 160(n) corresponding to an inverse of the one or more encoding units 110, wherein the encoded data blocks present in the intermediate decoded data 135 are directed by delivery unit 155 to appropriate decoding units 160(1) to 160(n) included in the second stage to regenerate the data blocks 40 within the decoder 25. The decoder 25 further includes a third stage 170 which is operable to apply an inverse of operations performed in the first stage 30 of the encoder 10, for generating the decoded data 75 (D3) corresponding substantially to the data 20 (D1) and/or the encoded data (E2). Additionally, or alternatively, spatial and size information of data blocks 40 are optionally generated in a first decoding stage 130. The spatial and position information is beneficially further sent to the second stage 150 in order to enable methods employed in the one or more decoding units 160(1) to 160(n) to operate properly with size information, and further sent to the third stage 170 to enable it to place data blocks in appropriate spatial positions.

Figure 4:
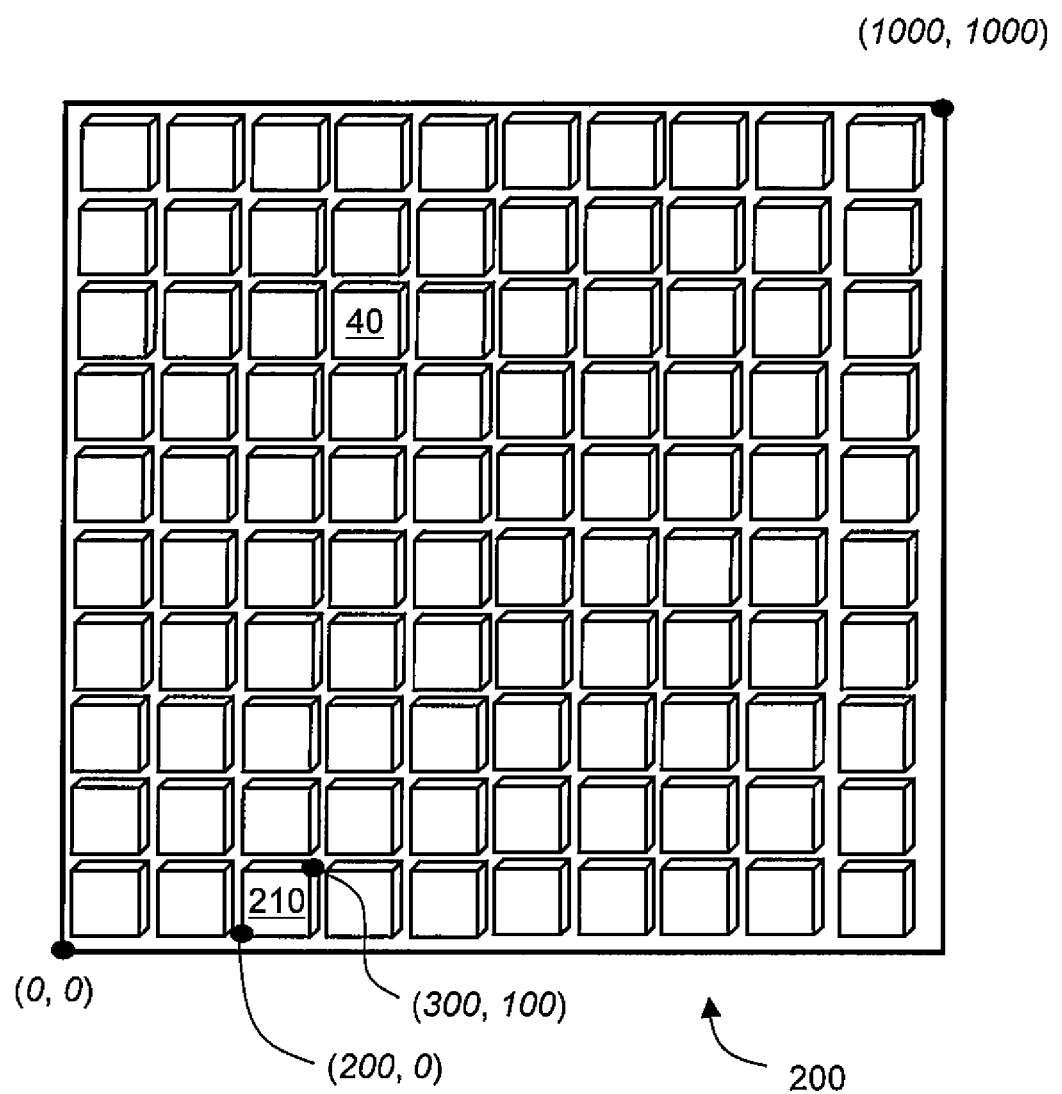
FIG. 4 is an illustration of subdividing image data into data blocks, namely portions, for encoding in the second encoding stage of the encoder of FIG. 2A.

The encoding algorithm pursuant to the present invention is susceptible to being employed to encode data blocks 40 of any size, although it is beneficially employed for encoding data blocks 40 including in a range of 8 to 256 elements or values, for example pixels. Moreover, the coding algorithm is conveniently referred to as being a multilevel coding method. A first and most useful implementation of the algorithm employs two levels, for example colours although not limited thereto as aforementioned, and is optimized to encode subject matter such as code command prompts, text and other content that include only two levels. However, it is optionally feasible to implement the algorithm to encode more than two levels, for example three levels, four levels, or even more levels, namely "multilevel"; beneficially, the number of levels into which data blocks are encoded is beneficially considerably less than a number of levels present in the data blocks 40 prior to being encoded, for example beneficially at least 3 times less, more beneficially at least 5 times less, and yet more beneficially at least 10 times less. The number of levels present in the data blocks prior to being encoded in the second stage 50 is referred to as being the original number of levels, namely is a measure of dynamic levels present in the data blocks 40, for example representative of image-, video-, audio- or graphics-content. For example, referring to FIG. 4, an image field 200 includes 1000×1000 pixel points in a 2-dimensional array, wherein the image field 200 is subdivided in the first stage 30 of the encoder 10 into 100 data blocks 40, denoted by 210, wherein each block 210 corresponds to 100×100 pixels, namely 10,000 pixels in total. Each pixel is represented in colour and/or intensity by 8 binary bits defining 256 levels of dynamic range. The dynamic range can also be limited, and then the number of levels can also be calculated by using the equation:

number of levels=amplitude value=maximum level−minimum level+1.

The number of levels can also be described by using the number of different levels used in the data or in the data block, and then the value can be the same or smaller than the amplitude value. For the original number of levels, all different equations can be used, but the output number of levels typically addresses the number of different levels used in the data block. When the encoding unit 110(i) encodes a given block 210, the number of levels is reduced, for example, in a range of 2 to 8, together with supplementary data as will be described later. In a event that the encoding unit 110(i) employs more than, for example, 8 levels, the encoding unit 110(i) becomes less efficient at providing data compression, requiring use of pre-processing of the image 200, for example predictive coding or delta coding, prior to data being presented to the second stage 50. One alternative also involves delivering levels of aggregate values by using bits to describe whether or not a value is in a range, for example the range being defined by minimum (min) and maximum (max) parameters, used for computing the aggregate value for level; for example, if the aggregate values are 10, 12, 13, 15, 17, then the delivery of level values includes values as 10 (=minimum aggregate value), and 6 to 8 (=amount of following bits) and (1)011010(1) to describe which aggregate values are used for different levels. Moreover, 6 bits is enough in this example, because the first value 10 and last value 17 are already known to be used due the two first delivery values 10 and 6. A substantially similar example with delta coding creates values such as 10 and 2, 1, 2, 2 can be split, for example to two streams of data to enable more efficient entropy encoding for minimum values and delta values.

The encoding algorithm employed in the encoding unit 110(i) is optionally employed for encoding a greyscale image or other information that only uses one channel. Moreover, the encoding algorithm employed in the encoding unit 110(i) is optionally employed for colour images or other multichannel content. Multichannel content, for example 3-D colour images, are optionally encoded so that all the channels are encoded/compressed similarly, or alternatively are optionally encoded/compressed in mutually different manners, for example data blocks of audio channels are optionally encoded in a different manner to data blocks of video channels. Multiple channels can also be coded together or separately, for example as a 24-bit RGB triplet or as 3×8-bit (R, G, B) colour values. In an event that the channels are encoded in a mutually different manner, different coding algorithms in the encoding units 110 and different sizes of the data blocks 40 can be employed; the selection of data block 40 sizes is, as aforementioned, optionally implemented on a basis of type of content present in the data 20 (D1) to be encoded. Size of the data blocks, or used coding algorithms, can also vary based on the data content, when the channels are coded similarly but separately, for example separate R, G, and B channels.

The data block values produced by employing the multilevel method pursuant to the present disclosure are optionally transferred also to a database, so that they can be utilized by later, successive data blocks. The database can be generated separately at the encoder 10, during encoding of the data 20 (D1), and optionally at the decoder 25, during decoding of the encoded data 70 (E2). Alternatively, both the encoder 10 and the decoder 25 can use a common database which either of them generates, or which some other device or software application has generated, and which both of them can utilize similarly. In both cases, the databases that the encoder 10 and the decoder 25 use are beneficially identical, and thus the database reference that is transmitted always represents similar data values in all stages, namely in the calculation at the encoder 10, in the reconstruction at the encoder 10, and also in the reconstruction at the decoder 25. With the data block values, or instead of the data block values, also the masks used in the multilevel method, can be transferred into the database. Both the masks and the data block values can be retrieved from the database to be used in coding content of future data blocks or the data blocks coded with the multilevel method pursuant to the present disclosure, thereby reducing the data size of the data to be stored and/or transmitted, and thereby further improving the compression ratio achievable in the codec arrangement 5.

The multilevel method pursuant to the present disclosure can also be utilized, for example, to compress databases or individual database elements in the databases. The method is very well suited for both lossless and lossy compression. For many types of data present in the data 20 (D1) to be encoded, such as audio and image or video data, lossy compression is not only acceptable, but improves the achievable compression ratio significantly in respect of the encoded data 70 (E2). However, some other types of data such as databases, documents or binary data often, if not always, need to be compressed losslessly, and therefore, a need usually arises to use multiple levels in the multilevel method, or alternatively, smaller data blocks can be optionally used in the codec arrangement 5.

Figure 5:
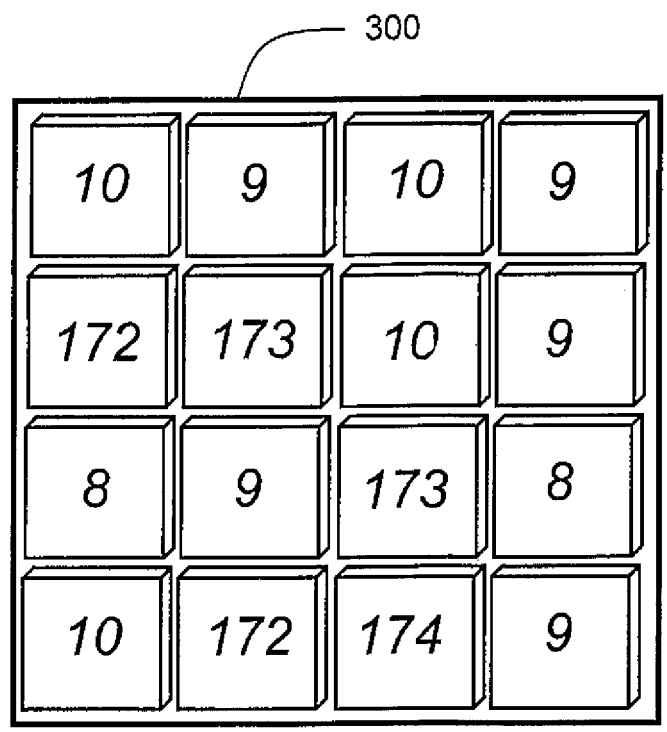
FIG. 5 is an illustration of a data block to be encoded using the encoder of FIG. 2A.

The encoding algorithm employed in the encoding unit 110($i$) will now be described in greater detail with reference to FIG. 5. In FIG. 5, an example original data block 40 is denoted by 300. The data block 300 includes 4×4 pixels having greyscale values as shown. Beneficially, the data block 300 is susceptible to being encoded efficiently in the encoding unit 1100 using an algorithm pursuant to the present disclosure, with a small coding error occurring during encoding.

When applying the algorithm, the value that divides the data to two data sets is beneficially first defined, for example a mean value for all pixels or elements in the block 300 is computed in computing hardware or dedicated digital hardware of the encoder 10 pursuant to Equation 1 (Eq. 1):

$$MeanAll = \frac{\left(\begin{array}{c}10+9+10+9+172+173+10+\\9+8+9+173+8+10+172+174+9\end{array}\right)}{16} = \frac{965}{16} = 60.3125 \qquad \text{Eq. 1}$$

Next, the algorithm defines two sets of levels, namely Level_0 and Level 1, wherein the set Level_0 includes all pixels whose values are below MeanAll, and the set Level_1 includes all pixels whose values are equal to or above MeanAll. The pixels of the data block 300 are then mapped onto a corresponding data block 320 in FIG. 6, wherein spatial locations of the pixels are retained but they are now represented by merely two levels corresponding to the sets Level_0 and Level_1. For each of the sets of levels, namely Level_0 and Level_1, mean values, namely an example of aggregate values, are computed in the aforesaid computing hardware or dedicated digital hardware pursuant to Equation 2 (Eq. 2) and Equation 3 (Eq. 3):

$$MeanLevel\_0 = \frac{(10+9+10+9+10+9+8+9+8+10+9)}{11} = \frac{101}{11} = 9.1818\ldots \qquad \text{Eq. 2}$$

$$MeanLevel\_1 = \frac{(172+173+173+172+174)}{5} = \frac{864}{5} = 172.8 \qquad \text{Eq. 3}$$

Optionally, numbers summed within the brackets above are each multiplied by an associated coefficient when a spatial weighted mean level is to be calculated, wherein the associated coefficients can be mutually different. In an event that the encoder 10 and decoder 25 use these coefficients, and inverses thereof when appropriate, it is feasible to "watermark" data when encoded and compressed, for example to discourage unauthorized copying of data, wherein the decoder 25 is provided with the inverse coefficients, for example from a database, in return for payment, for example a regular subscription payment. This enables, for example, data content to be consumed by a given end user in a degraded quality free of cost, and consumed by the given end user in high quality in return for making a subscription payment, or similar type of payment.

Thereafter, referring to Equations 2 and 3 above (Eq. 2 and Eq. 3), when executing the algorithm, a spatial representation of the pixels in the data block 300 is stored as a pixel mask 320, together with aggregate values for each of the sets of levels, namely MeanLevel_0 and MeanLevel_1; alternatively, instead of storing in data memory, such data is streamed from the encoding unit 110(1). Although an arithmetic mean computation is described in the foregoing for the algorithm, it will be appreciated that other types of computation are possible, for example a skewed mean, an asymmetrical mean, a logarithmic mean, a geometric mean, minimum value, a maximum value, a modal value, a median value. Optionally, the values for each of the set of levels can be calculated using any calculating means, and by using dedicated digital hardware and/or a computing device executing software products. One example for computing the aggregate value is to select an original data value that minimizes a distance between the original data value and a mean value of a maximum value and a minimum value. Such a kind of aggregate value minimizes a maximum error in the data set and often also results in a smaller MSE. From a point of view of the decoder, a method of calculation employed is not a key issue. Optional examples of computing means include "brute force" methods, Monte Carlo methods and so forth, to find optimum number of levels and values for the set of levels. Example optimization can be Rate-Distortion optimization to determine how many bits are be used during coding and how much error is allowed for the coded information. Instead of outputting from the method two aggregate values, one aggregate value is optionally output from a reference of one or more other aggregate values, and a difference value for the one or more other aggregate values relative to the reference value, for example 9.1818 and (172.8-9.1818). Optionally, the aggregate values as computed above are quantized, for example to nearest integer values, in order to obtain a higher degree of data compression in output data from the encoding unit 110(1). Optionally, a degree of quantization employed is a dynamic function of how many sets are required to represent the data block 300. Quantization to nearest integer for the example above provides aggregate values as MeanLevel_0=9, and MeanLevel_1=173.

Figure 6:
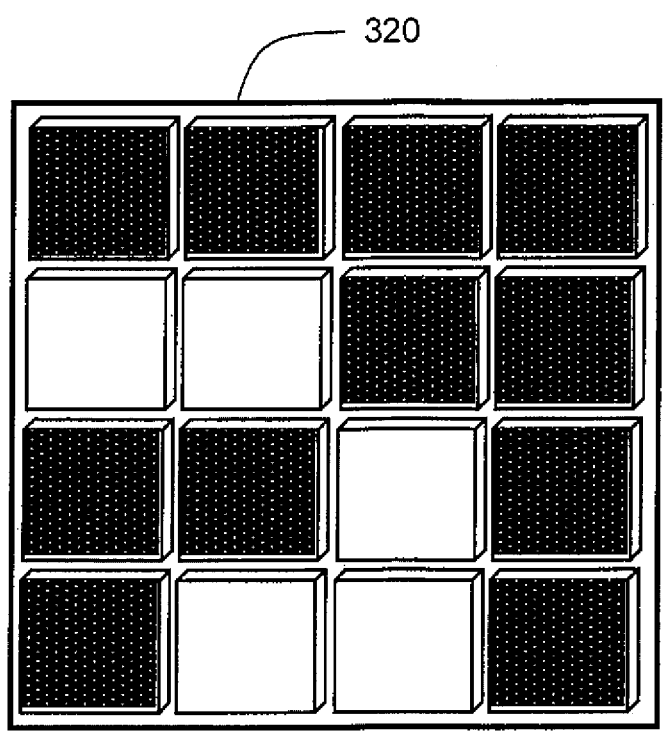
FIG. 6 is an illustration of a mask for the data block of FIG. 5, after computation of aggregate values for sets of levels employed to represent the data block of FIG. 5.

When generating encoded data 70 (E2) from the encoding unit 110(1), a spatial representation of the pixels, namely a mask, is output, based upon the pixel mask 320, in a plurality of potential scanning orders, for example left-to-right and top-to-bottom as illustrated in FIG. 6, in a zig-zag manner, maze or similar. In an example, the mask is output left-to-right and top-to-bottom such that mask is expressed in output data from the encoding unit 110($i$) as 0000 1100 0010 0110.

When the encoder 10 is employed to encode video content (D1), a sequence of images is presented to the encoder 10, wherein each image is susceptible to being broken down into data blocks 40 which are then encoded using the encoding units 110 as appropriate depending upon their content as analyzed by the analysis unit 100. Beneficially, as aforementioned, the encoder 10 switches dynamically between the different encoding units 110 depending upon a nature of data blocks presented to the second stage 50 for encoding. The choice of encoding units 110 is, as aforementioned, recorded in the encoded data from the second stage 50. The third stage 60 optionally applies further encoding and/or compression, for example using one or more of DPCM ("differential pulse-code modulation"), RLE ("run-length encoding"), SRLE, EM (Entropy Modifier), arithmetic coding, delta coding, ODelta coding, VLC ("Variable-length coding"), Lempel-Ziv coding methods (such as ZLIB, LZO, LZSS, LZ77), Burrow-Wheeler transform based coding methods (such as RLE, BZIP2) and Huffman coding. Delivery of the mask, namely scanning order for data sets output from the second stage 50, is beneficially implemented via a database, for example as described in a United States Patent Application No. 2010/0322301 ("Image processor, image generator and computer program", Applicant—Gurulogic Microsystems Dy, Inventor—Tuomas Kärkkäinen) which is hereby incorporated by reference. Use of such a database for providing a path by which the mask is communicated to a corresponding decoder is capable of providing a form of access key, for example for hindering unauthorized distribution of encoded content in encoded form (i.e. unauthorized file sharing).

Figure 7:
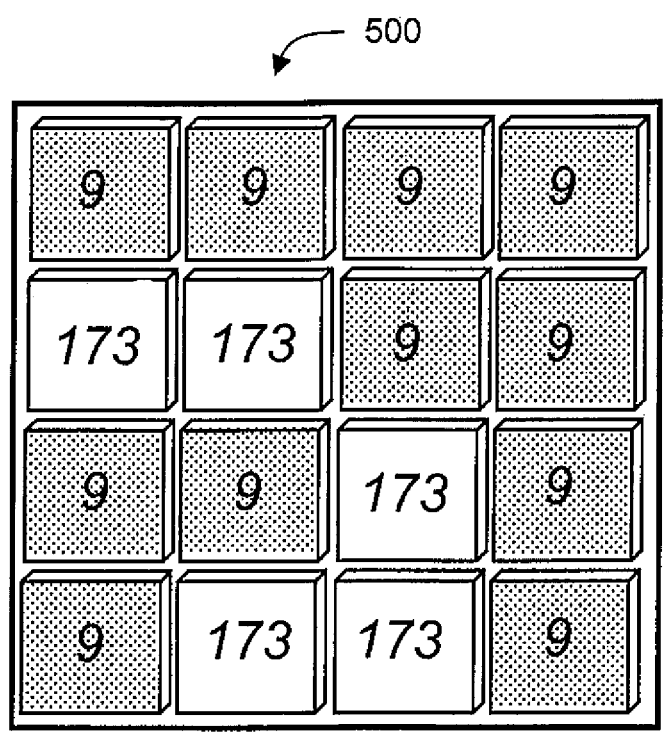
FIG. 7 is an illustration of a regenerated decoded data block derived from encoded data generated by the encoder of FIG. 2A.

A regenerated decoded version of the data block 300 of FIG. 5 is illustrated in FIG. 7 and indicated by 500. This regenerated data block 500 corresponds to a portion of the decoded output data 75 (D3) provided from the decoder 25. It will be appreciated that only minor loss of information present in the data block 500 occurs relative to the original data block 40, 300 which is input to the encoder 10.

Another example has seventeen samples of measurement data that can also be encoded efficiently by using a multilevel method of the present disclosure. The original sample values are as follows:

122, 153, 190, 198, 188, 156, 153, 119, 148, 122, 122, 153, 196, 120, 198, 152, 154

The mean value (=155.53) can be used to divide these values to two groups, but this is not the best solution for coding the data. Two groups then contain values as follows:

low =122, 153, 153, 119, 148, 122, 122, 153, 120, 152, 154 (Mean=138)

high=190, 198, 188, 156, 196, 198 (Mean=187.66)

These two levels with mean values as aggregate values (138 and 188) potentially result in a high reconstruction error (sum of absolute differences (SAD)=230).

A better division point can be found, for example, by using an equation as follows:

(Min+Max)/2=(119+198)/2=158.5, and then those two groups contain the following values:

low=122, 153, 156, 153, 119, 148, 122, 122, 153, 120, 152, 154 (Mean=139.5)

high=190, 198, 188, 196, 198 (Mean=194)

These two levels with values 140 and 194 potentially result in a lower error (SAD=204).

Similar division to two level groups (low and high) are optionally also computed in several other ways. One beneficial solution for the level group division is the solution that divides the data to new level groups when a change in the data is high, or highest. Such a highest change can be found easily when the data is first ordered from an associated lowest value to an associated highest value. The ordered data values are as follows:

119, 120, 122, 122, 122, 148, 152, 153, 153, 153, 154, 156, 188, 190, 196, 198, 198, and the highest change in data is between the values 188 and 156 (=32).

With two levels, the reconstruction error is still quite high, and a similar division rule can be continued for the group where the change in data is highest. In this case, the second division point can be found between the values 148 and 122 (=26). Now, the level groups are as follows:

group(0)=119, 120, 122, 122, 122 (Mean=121)
group(1)=148, 152, 153, 153, 153, 154, 156 (Mean=152.71)
group(2)=188, 190, 196, 198, 198 (Mean=194)

Now, with these three levels and aggregate values 121, 153, and 194, the SAD is only (6+10+20=)36.

It is also possible to use modal or model values as aggregate values for these three levels, and then the aggregate values are as follows: 122, 153, and 198. Now, the SAD is (5+10+20=) 35.

Using the median as aggregate value would create the values 122, 153, and 196. The SAD is now (5+10+18=)33. The aggregate value can always be selected freely, and different aggregate values for different groups can be used to create a best reconstruction, depending on selected error criteria.

If the SAD value 33 is not good enough, then it is possible to create even more levels, for example 4 to 12 levels, or the reconstruction error, namely delta values, can be encoded by using some coding method, for example VLC.

If the SAD value 33 is good enough, then these three aggregate level values (122, 153, and 196) are used within a mask that describes which data values belong to which levels. Now, because the level 1 has the most values, those mask values are set to "0", level 0 values are set to "10" and level 2 values are set to "11". So, the mask values can be presented as follows:

10, 0, 11, 11, 11, 0, 0, 10, 0, 10, 10, 0, 11, 10, 11, 0, 0

It is also optionally possible to use two sets of binary masks to describe the mask that specifies the data for different levels. For example, the first binary mask specifies the first division for low values (<=156) as "0" and high values (>=188) as "1":

0, 0, 1, 1, 1, 0, 0, 0, 0, 0, 0, 0, 1, 0, 1, 0, 0, and the second binary mask specifies the second division of low values for group(0) (<=122) as "0" and group(1) (>=148) as "1":

0, 1, 1, 1, 0, 1, 0, 0, 1, 0, 1, 1.

One advantageous solution to divide data to different sets is always to divide the set that contains a highest amplitude, namely (max−min+1). If multiple sets have the same amplitude, then the set that contains most data values is beneficially chosen to be divided. Such a kind of set of divisions are continued as long as the highest amplitude is small enough, namely does not exceed a threshold value. Then, aggregate values are defined for each set by using, for example, modal or median values.

Optionally, it is also possible to iterate sets adding one set at the time, so that always when the new division to sets is executed, there are also the new aggregate values generated; the new sets are then recreated by putting all the data values to the set whose aggregate value is closest to the data value. There are many beneficial implementations available for creation of sets and definitions of aggregate values, but the end result of the encoding is always to employ one or more masks 320 and two or more aggregate values, and those are output of the method implemented by employing the encoding unit 110(1).

All the example masks and aggregate values can be further compressed with a multiplicity of methods such as delta, RLE, VLC, database, and so forth.

The encoder 10 and/or decoder 25 are beneficially implemented using dedicated electronic hardware, for example a custom digital integrated circuit, a field-programmable gate array (FPGA) or similar. Alternatively, or additionally, the encoder 10 and/or the decoder 25 can be implemented by executing one or more software products, stored on non-transitory (non-transient) machine-readable data storage media, on computing hardware coupled in data communication with data memory. Optionally, the computing hardware is implemented as a high-speed reduced-instruction-set (RISC) processor. The encoded data 70 (E2) is optionally one or more of streamed, stored on a data carrier such as an optically-readable disc, stored in data memory and so forth.

Modifications to embodiments described in the foregoing are possible without departing from the scope of the invention as defined by the accompanying claims. Expressions such as "including", "comprising", "incorporating", "consisting of", "have", "is" used to describe and claim the present invention are intended to be construed in a non-exclusive manner, namely allowing for items, components or elements not explicitly described also to be present. Reference to the singular is also to be construed to relate to the plural. Numerals included within parentheses in the accompanying claims are intended to assist understanding of the claims and should not be construed in any way to limit subject matter claimed by these claims.

What is claimed is:

1. An encoder for encoding data to generate corresponding encoded data, the encoder comprising:
   a processor comprising:
      an analysis unit analysing one or more portions of one or more data blocks to be encoded wherein at least one data block of the one or more data blocks is of different size with respect to one or more other data blocks of the one or more data blocks depending upon a nature of data content included in the one or more data blocks, and directing the one or more portions to appropriate plurality of encoding units;
      the plurality of encoding units are configured to encode the one or more portions thereby generating encoded data corresponding to the one or more data blocks,
      wherein the plurality of encoding units are configured to employ mutually different encoding algorithms when encoding the one or more portions,
      wherein at least one encoding unit of the plurality of encoding units is configured to compute data values present in each portion received by the at least one encoding unit subdivides the data values into at least two sets, computes at least one aggregate value for a given-set derived from the data values present in the given set, and whilst retaining a spatial mask of the portion, and
      wherein the spatial mask and information representative of the aggregate values computed for the at least two data sets are included in the encoded data; and
      an output encoder unit receiving encoded output data from the plurality of encoding units and further encoding the encoded output data to generate the total encoded data from the encoder.

2. The encoder according to claim 1, further comprising an input stage receiving the data to be encoded, performing an action on at least a portion of the data to be encoded, and generating the one or more portions when the data to be encoded is not included in the one or more portions, wherein the action is selected from the group consisting of: subdividing the at least a portion of the data, and combining the at least a portion of the data.

3. The encoder according to claim 1, wherein the encoder is configured to store information representative of one or more masks of the one or more portions of data in a remote database for access by one or more decoders when decoding the encoded data generated by the encoder.

4. The encoder according to claim 1, wherein the at least one aggregate value is selected from the group consisting of: an arithmetic average, a skewed average, a logarithmic average, a weighted average, a mean value, a minimum value, a maximum value, a modal value, and a median value.

5. A method of encoding data to generate corresponding encoded data, comprising:
   analysing, by an analysis unit of a processor, one or more portions of one or more data blocks to be encoded wherein at least one data block of the one or more data blocks is of different size with respect to one or more other data blocks of the one or more data blocks depending upon a nature of data content included in the one or more data blocks, and directing the one or more portions to appropriate plurality of encoding units, wherein the plurality of encoding units are configured to encode the one or more portions and generate encoded data corresponding to the one or more portions of the one or more data blocks, wherein the plurality of encoding units are configured to employ mutually different encoding algorithms when encoding the one or more portions;
   computing, by at least one encoding unit of the plurality of encoding units of a processor, data values present in each portion received by the at least one encoding unit, subdividing the data values into at least two sets, computing at least one aggregate value for a given set derived from the data values present in the given set, and whilst retaining a spatial mask of the portion, wherein the spatial mask and information representative of the aggregate values computed for the at least two data sets are included in the encoded data; and
   using an output encoder unit for receiving encoded output data from the plurality of encoding units and for further encoding this encoded output data to generate the total encoded data.

6. The method according to claim 5, further comprising storing information representative of one or more masks of the one or more portions in a remote database for access by one or more decoders when decoding the encoded data.

7. The method according to claim 5, further comprising performing, by the processor, an action on the encoded data, wherein the action is selected from the group consisting of: encoding the encoded data, and compressing the encoded data.

8. The method according to claim 7, wherein the action performed on the encoded data is selected from the group consisting of: Differential Pulse-Code Modulation ("DPCM"), Run-Length Encoding ("RLE"), Simple Run-Length Encoding ("SRLE"), Entropy Modifier ("EM"), arithmetic encoding, delta coding, ODelta coding, Variable-Length Coding ("VLC"), Lempel-Ziv coding, Burrow-Wheeler transform-based coding, and Huffman coding.

9. A decoder for decoding encoded data to generate corresponding decoded data, the decoder comprising:
   a processor comprising:
      a delivery unit delivering one or more portions of encoded data containing an encoded version of one or more data blocks and directing the one or more portions of encoded data to appropriate plurality of decoding units based on an encoding algorithm associated with a respective portion of encoded data, wherein at least one data block of the one or more data blocks is of different size with respect to one or more other data blocks of the one or more data blocks depending upon a nature of data content included in the one or more data blocks,
      wherein the plurality of decoding units are configured to decode the one or more portions thereby generating decoded data corresponding to the one or more portions of the one or more data blocks, wherein at least one decoding unit of the plurality of decoding units is-configured to extract a spatial mask and information representative of aggregate values for at least two data sets included in the encoded data, and assigns values to elements in the data block pursuant to which of the sets the elements belong as defined by the mask; and an output decoder unit for receiving decoded output data from the plurality of decoding units and for further combining these decoded output data to generate the total decoded data from the decoder.

10. The decoder according to claim 9, further comprising an input stage for extracting from the encoded data one or more portions for directing as defined by encoding parameters present in the encoded data to the delivery unit and to one or more decoding units.

11. The decoder according to claim 9, wherein the decoder is configured to retrieve information representative of one or more masks of the one or more portions from a remote database when decoding the encoded data generated by an encoder.

12. A method of decoding encoded data to generate corresponding decoded data, comprising:

delivering, by a delivery unit of a processor, one or more portions of encoded data containing an encoded version of one or more data blocks and directing the one or more portions of encoded data to appropriate plurality of decoding units based on an encoding algorithm associated with a respective portion of encoded data, wherein at least one data block of the one or more data blocks is of different size with respect to one or more other data blocks of the one or more data blocks depending upon a nature of data content included in the one or more data blocks, and wherein the plurality of decoding units are configured to decode the one or more portions thereby generating decoded data corresponding to the one or more portions of the one or more data blocks;

extracting, by at least one decoding unit of the plurality of decoding units of a processor, a spatial mask and information representative of aggregate values computed for at least two data sets included in the encoded data, and assigning aggregate values to elements in the data block pursuant to which of the sets the elements belong as defined by the spatial mask; and using an output decoder unit for receiving decoded output data from the plurality of decoding units and for further combining these decoded output data to generate the total decoded data.

13. The method according to claim 12, further comprising using an input stage for extracting from the encoded data one or more portions for directing as defined by encoding parameters present in the encoded data to the delivery unit and to one or more decoding units.

14. The method according to claim 12, wherein the at least one decoding unit of the one or more decoding units is configured to assign values to elements of the spatial mask corresponding to the data sets.

15. The method according to claim 14, wherein there are 8 or less data sets.

16. The method according to claim 12, further comprising retrieving information representative of one or more masks of the one or more portions from a remote database when decoding the encoded data generated by an encoder.

17. A data communication system comprising:

at least one encoder encoding one or more portions of one or more data blocks and generating encoded data corresponding to the one or more portions of the one or more data blocks wherein at least one data block of the one or more data blocks is of different size with respect to one or more other data blocks of the one or more data blocks depending upon a nature of data content included in the one or more data blocks, the encoder comprising:

a processor comprising:

an analysis unit analysing the one or more portions of the one or more data blocks to be encoded, and directing the one or more portions to appropriate plurality of encoding units; and the plurality of encoding units configured to encode the one or more portions thereby generating the encoded data, wherein the plurality of encoding units are configured to employ mutually different encoding algorithms when encoding the one or more portion, wherein at least one encoding unit of the plurality of encoding units is configured to compute data values present in each portion received by the at least one encoding unit, subdivides the data values into at least two sets, computes at least one aggregate value for a given subdivided set derived from the data values present in the given set, and whilst retaining a spatial mask of the portion, wherein the spatial mask and information representative of the aggregate values computed for the at least two subdivided data sets are included in the encoded data; and an output encoder unit receiving encoded output data from the plurality of encoding units and further encoding the encoded output data to generate the total encoded data from the encoder; and at least one decoder decoding one or more portions of the encoded data and generating decoded data corresponding to the one or more portions of the one or more data blocks, the decoder comprising:

a processor comprising:

a delivery unit delivering the one or more portions of the encoded data and directing the one or more portions of the encoded data to appropriate plurality of decoding units based on an encoding algorithm associated with a respective portion of the encoded data, wherein the plurality of decoding units are configured to decode the one or more portions thereby generating the decoded data, wherein at least one decoding unit of the plurality of decoding units is configured to extract a spatial mask and information representative of aggregate values for at least two data sets included in the encoded data, and assigns values to elements in the data block pursuant to which of the sets the elements belong as defined by the mask; and an output decoder unit for receiving decoded output data from the plurality of decoding units and for further combining these decoded output data to generate the total decoded data from the decoder.

18. A method of communicating data comprising:

analysing, by an analysis unit of a processor, one or more portions of one or more data blocks to be encoded wherein at least one data block of the one or more data blocks is of different size with respect to one or more other data blocks of the one or more data blocks depending upon a nature of data content included in the one or more data blocks, and directing the one or more portions to appropriate plurality of encoding units, wherein the plurality of encoding units are configured to encode the one or more portions thereby generating encoded data corresponding to the one or more portions of the one or more data blocks, wherein the plurality of encoding units are configured to employ mutually different encoding algorithms when encoding the one or more portions;

computing, by at least one encoding unit of the plurality of encoding units of a processor, data values present in each portion of data received by the at least one encoding unit subdividing the data values into at least two sets, computing at least one aggregate value for a given set derived from the data values present in the given set, and whilst retaining a spatial mask of the portion, wherein the spatial mask and information representative of the aggregate values computed for the at least two data sets are included in the encoded data;

using an output encoder unit for receiving encoded output data from the plurality of encoding units and for further encoding this encoded output data to generate the total encoded data;

delivering, by a delivery unit of a processor, one or more portions of the encoded data and directing the one or more portions of the encoded data to appropriate plurality of decoding units based on an encoding algorithm associated with a respective portion of encoded data, wherein the plurality of decoding units are configured to decode the one or more portions thereby generating decoded data corresponding to the one or more portions of the one or more data blocks;

extracting, by at least one decoding unit of the plurality of decoding units of a processor, a spatial mask and information representative of aggregate values computed for at least two data sets included in the encoded data, and assigning aggregate values to elements in a data block pursuant to which of the sets the elements belong as defined by the spatial mask; and using an output decoder unit for receiving decoded output data from the plurality of decoding units and for further combining these decoded output data to generate the total decoded data.

* * * * *